United States Patent
Kim et al.

(10) Patent No.: US 11,386,523 B2
(45) Date of Patent: Jul. 12, 2022

(54) LSTM BASED PERSONALIZATION VIEW POINT ESTIMATION APPARATUS AND METHOD

(71) Applicant: Fdn. for Res. & Bus., Seoul Nat. Univ. of Sci. & Tech., Seoul (KR)

(72) Inventors: Dong Ho Kim, Seoul (KR); Bong-Seok Seo, Gyeonggi-do (KR); Changjong Hyun, Seoul (KR)

(73) Assignee: Fdn. For Res. & Bus., Seoul Nat. Univ. Of Sci. & Tech., Seoul (KR)

( * ) Notice: Subject to any disclaimer, the term of this patent is extended or adjusted under 35 U.S.C. 154(b) by 0 days.

(21) Appl. No.: 17/117,278

(22) Filed: Dec. 10, 2020

(65) Prior Publication Data

US 2022/0180469 A1 Jun. 9, 2022

(30) Foreign Application Priority Data

Dec. 9, 2020 (KR) .................. 10-2020-0171438

(51) Int. Cl.
  *G06T 3/00* (2006.01)
  *H04N 5/232* (2006.01)
  *G06T 7/215* (2017.01)
  *G06V 10/40* (2022.01)

(52) U.S. Cl.
  CPC ............ *G06T 3/0087* (2013.01); *G06T 7/215* (2017.01); *G06V 10/40* (2022.01); *H04N 5/23238* (2013.01); *G06T 2207/20081* (2013.01); *G06T 2207/20084* (2013.01)

(58) Field of Classification Search
  CPC .............. G06T 3/0087; G06T 7/215; G06T 2207/20081; G06T 2207/20084; G06K 9/46; H04N 5/23238; G06V 10/40
  USPC ........................................ 348/38
  See application file for complete search history.

(56) References Cited

U.S. PATENT DOCUMENTS

| | | | |
|---|---|---|---|
| 2012/0056977 A1* | 3/2012 | Ohnishi | G06T 3/0043 348/E7.003 |
| 2021/0127059 A1* | 4/2021 | Powell | G02B 13/0005 |
| 2021/0223858 A1* | 7/2021 | Barak | A63F 13/428 |

FOREIGN PATENT DOCUMENTS

KR  102093577  5/2020

OTHER PUBLICATIONS

Hyun, C.J., "A Study on 360 Viewport Prediction Using LSTM Model," Thesis, Department of Media IT Engineering, 1-58 (2020).

* cited by examiner

Primary Examiner — Allen C Wong
(74) Attorney, Agent, or Firm — HoustonHogle LLP

(57) ABSTRACT

Disclosed are an LSTM based personalization viewpoint estimation apparatus and method. According to an embodiment of the present disclosure, a viewpoint of a user is estimated using LSTM with respect to a 360-degree raw image and a viewpoint image that is a region of interest of the user and a tile including the estimated viewpoint is transmitted over a network, so that the amount of data to transmit compared to the network bandwidth may be reduced and a viewpoint of each individual may be estimated.

9 Claims, 4 Drawing Sheets

| | train set | | validation set | | test set | |
|---|---|---|---|---|---|---|
| | loss | acc | loss | acc | loss | acc |
| Proposed model | 0.0187 | 84.28% | 0.0193 | 84.25% | 0.0213 | 82.63% |
| Conventional model | 0.0364 | 76.32% | 0.0381 | 75.66% | 0.0403 | 74.03% |

| Image | Proposed model | | | Conventional model | | |
|---|---|---|---|---|---|---|
| Performance | precision | recall | f-score | precision | recall | f-score |
| Cockpit | 0.67 | 0.70 | 0.68 | 0.62 | 0.63 | 0.62 |
| Turtle | 0.79 | 0.80 | 0.80 | 0.73 | 0.72 | 0.72 |
| UnderwaterPark | 0.63 | 0.64 | 0.63 | 0.61 | 0.60 | 0.61 |
| Bar | 0.67 | 0.70 | 0.69 | 0.62 | 0.64 | 0.63 |
| Touvet | 0.63 | 0.64 | 0.63 | 0.59 | 0.6 | 0.6 |

FIG. 5

| Image | Proposed model | | | Conventional model | | |
|---|---|---|---|---|---|---|
| Performance | precision | recall | f-score | precision | recall | f-score |
| Cockpit | 0.63 | 0.64 | 0.64 | 0.57 | 0.58 | 0.57 |
| Turtle | 0.74 | 0.70 | 0.72 | 0.64 | 0.66 | 0.65 |
| UnderwaterPark | 0.62 | 0.61 | 0.61 | 0.56 | 0.57 | 0.57 |
| Bar | 0.64 | 0.61 | 0.63 | 0.58 | 0.53 | 0.55 |
| Touvet | 0.58 | 0.57 | 0.57 | 0.55 | 0.56 | 0.56 |

FIG. 6

| Image | Proposed model | | | Conventional model | | |
|---|---|---|---|---|---|---|
| Performance | precision | recall | f-score | precision | recall | f-score |
| Cockpit | 0.59 | 0.6 | 0.59 | 0.54 | 0.51 | 0.52 |
| Turtle | 0.63 | 0.65 | 0.64 | 0.59 | 0.61 | 0.60 |
| UnderwaterPark | 0.60 | 0.60 | 0.60 | 0.56 | 0.55 | 0.55 |
| Bar | 0.57 | 0.59 | 0.58 | 0.52 | 0.52 | 0.52 |
| Touvet | 0.52 | 0.53 | 0.52 | 0.51 | 0.51 | 0.51 |

FIG. 7

LSTM BASED PERSONALIZATION VIEW POINT ESTIMATION APPARATUS AND METHOD

RELATED APPLICATIONS

This application claims priority to Korean Application No. 10-2020-0171438, filed on Dec. 9, 2020, which is incorporated herein by reference in its entirety.

FIELD OF THE INVENTION

The present disclosure relates to an LSTM based personalization viewpoint estimation apparatus and method. More particularly, the present disclosure relates a technology that enables estimation of a viewpoint in a predetermined future by using long short-term memory (LSTM) for a 360-degree raw image and a viewpoint image.

DESCRIPTION OF THE RELATED ART

Recently, research on 360-degree images and images having 3DoF+ or higher has been constantly conducted, and research on a region of interest of a user through machine learning has been widely conducted.

In a case of a machine learning algorithm, a viewpoint of a user is transmitted only considering an environment in which a tile is in a fixed shape of NXN, and there are limitations because it is impossible to support various shapes of tiles.

In addition, viewpoints including regions of interest of various users are estimated using an average value of viewpoints estimated for each user, and estimated viewpoints are displayed through a saliency map and a motion map. Unfortunately, the amount of computation is large due to preprocessing. The overall estimation accuracy may be high, but the individual estimation accuracy is low.

Therefore, the applicant intends to provide a method, wherein a viewpoint of a user is estimated using LSTM with respect to a 360-degree raw image and a viewpoint image that is a region of interest of the user and a tile including the estimated viewpoint is transmitted over a network, so that the amount of data to transmit compared to the network bandwidth may be reduced and a viewpoint of each individual may be estimated.

Document of Related Art (Patent Document 1) Korean Patent No. 2093577 (FUTURE VIDEO GENERATING METHOD BASED ON LEARNING NETWORK).

SUMMARY OF THE INVENTION

The present disclosure is directed to providing an LSTM based personalization viewpoint estimation apparatus and method, wherein with respect to 360-degree raw images and a viewpoint image that is a region of interest of a user among the 360-degree raw images, a user viewpoint in the future is estimated using LSTM and a tile including the estimated viewpoint is transmitted over a network, so that the amount of data to transmit compared to the network bandwidth may be reduced.

The present disclosure is directed to providing an LSTM based personalization viewpoint estimation apparatus and method capable of estimating a viewpoint for each individual.

The objectives of the present disclosure are not limited thereto, and the other objectives and advantages of the present disclosure which are not described will be understood from the following description and become apparent by the embodiments of the present disclosure. In addition, it is understood that the objectives and advantages of the present disclosure may be implemented by components defined in the appended claims or their combinations.

According to an embodiment of the present disclosure, there is provided an LSTM based personalization viewpoint estimation apparatus including:

a raw image acquisition unit acquiring 360-degree raw images of a predetermined number of frames through multiple cameras;

a viewpoint image acquisition unit acquiring a user viewpoint image that is a region of interest of a user among the acquired raw images of the respective frames, through degrees of freedom (DoF) of a head mounted display (HMD);

a preprocessing unit extracting a 1D feature of the raw image and the user viewpoint image for each frame by using a convolutional neural network algorithm, and combining the extracted features and user positions into a series of vectors to generate input data;

an LSTM execution unit estimating a user viewpoint in a predetermined future by performing learning on the input data of the preprocessing unit; and a transmission unit transmitting tile information including the estimated user viewpoint of the future over a network.

Preferably, the raw images are
in an equirectangular projection (ERP) form.

Preferably, the input data includes
at least one among the ERP image of any integer t frame, a value acquired by normalizing a viewpoint position derived through the DoF, and the viewpoint image with no distortion.

Preferably, the LSTM execution unit is
a time-series deep-learning artificial neural network performing estimation of the viewpoint with respect to the input data.

Preferably, the LSTM execution unit includes:
an encoder extracting feature data for executing LSTM on the input data of the preprocessing unit, and transmitting the extracted feature data and a computed state vector; and a decoder estimating the viewpoint in the predetermined future by performing learning on the feature data and the computed state vector.

According to another embodiment of the present disclosure, there is provided an LSTM based personalization viewpoint estimation method including steps of:

acquiring 360-degree raw images in an equirectangular projection (ERP) form of a predetermined number of frames through multiple cameras;

acquiring a viewpoint image from the acquired raw images of the respective frames, through degrees of freedom (DoF) of an HMD;

preprocessing for extracting a 1D feature of the raw image and the viewpoint image for each frame by using a convolutional neural network algorithm, and combining the extracted features and user positions into a series of vectors to generate input data;

estimating a user viewpoint in a predetermined future by performing learning on the input data of the preprocessing step based on LSTM; and transmitting tile information including the estimated user viewpoint of the future over a network.

Preferably, the input data includes at least one among the ERP image of any integer t frame, a value acquired by normalizing a viewpoint position derived through the DoF, and the viewpoint image with no distortion.

Preferably, the estimating step includes:

extracting feature data for executing LSTM on the input data of the preprocessing step, and transmitting the extracted feature data and a computed state vector; and estimating the user viewpoint of the predetermined future by performing learning on the basis of the feature data and the state vector.

According to the embodiments of the present disclosure, with respect to a 360-degree raw image and a viewpoint image that is a region of interest of the user, a user viewpoint in a predetermined future is estimated using LSTM and a tile including the estimated user viewpoint is transmitted over the network, so that the amount of data to transmit compared to the network bandwidth may be reduced.

Thus, a viewpoint for each individual may be estimated, and it is easy to produce content with improved immersion.

BRIEF DESCRIPTION OF THE DRAWINGS

The accompanying drawings illustrate a preferred embodiment of the present disclosure and together with the following disclosure, serve to provide further understanding of the technical features of the present disclosure, and thus, the present disclosure is not to be construed as being limited to the drawing, in which:

FIG. 3 is a detailed configuration diagram showing an LSTM execution unit according to the embodiment;

FIGS. 4 to 7 are exemplary diagrams showing evaluation of performance for evaluation criteria according to the embodiment.

DETAILED DESCRIPTION OF THE INVENTION

Figure 1:
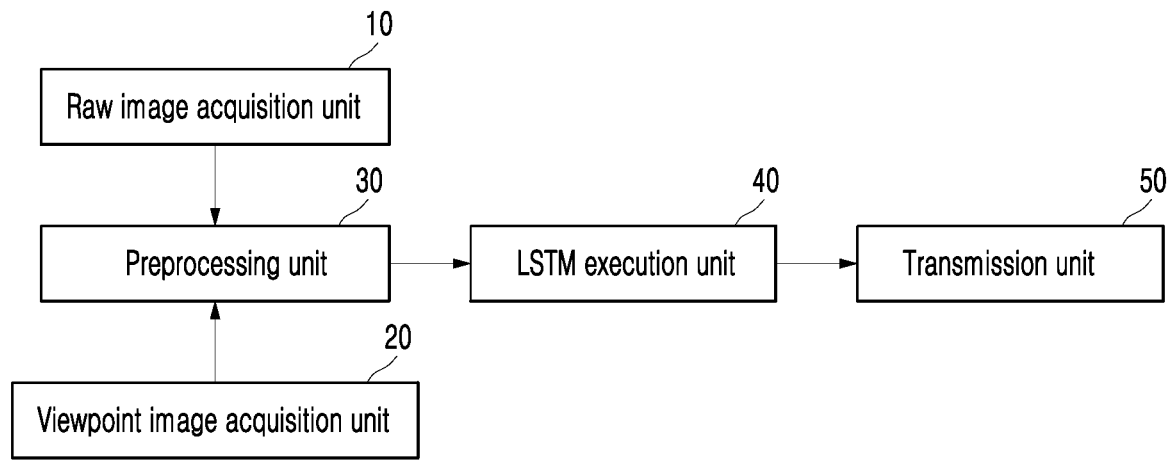
FIG. 1 is a configuration diagram showing an LSTM based personalization viewpoint estimation apparatus according to an embodiment.

Hereinafter, embodiments of the present disclosure will be described in detail with reference to the drawings.

The present disclosure and method of accomplishing the same may be understood more readily by reference to the following detailed description of embodiments and the accompanying drawings. However, the present disclosure may be embodied in many different forms, and should not be construed as being limited to the embodiments set forth herein. Rather, these embodiments are provided so that this disclosure will be thorough and complete and will fully convey the concept of the disclosure to those skilled in the art, and the present disclosure will only be defined by the appended claims.

The terminology used herein will be described briefly, and the embodiments of the present disclosure will be described in detail.

The terminology used herein is defined considering the function of corresponding components used in the present disclosure and may be varied according to users, operator's intention, or practices. In addition, an arbitrary defined terminology may be used in a specific case and will be described in detail in a corresponding description paragraph. Therefore, the terminology used herein is for the purpose of describing particular embodiments only and is not intended to be limiting of the disclosure.

Throughout the specification, when a part "includes" an element, it is noted that it further includes other elements, but does not exclude other elements, unless specifically stated otherwise. Further, the term "unit" used in the specification means a software component or hardware component such as an FPGA or an ASIC, and performs a specific function. However, the term "unit" is not limited to software or hardware. The term "unit" may be foamed so as to be in an addressable storage medium, or may be formed so as to operate one or more processors.

Thus, for example, the term "unit" may refer to components such as software components, object-oriented software components, class components, and task components, and may include processes, functions, attributes, procedures, subroutines, segments of program code, drivers, firmware, micro codes, circuits, data, a database, data structures, tables, arrays, and variables. A function provided by the components and "units" may be associated with the smaller number of components and "units", or may be divided into additional components and "units".

Hereinbelow, embodiments of the present disclosure will be described in detail with reference to the accompanying drawings such that the present disclosure can be easily embodied by those skilled in the art to which this present disclosure belongs. In the drawings, parts irrelevant to the description are omitted to clearly describe the present disclosure.

Figure 2:
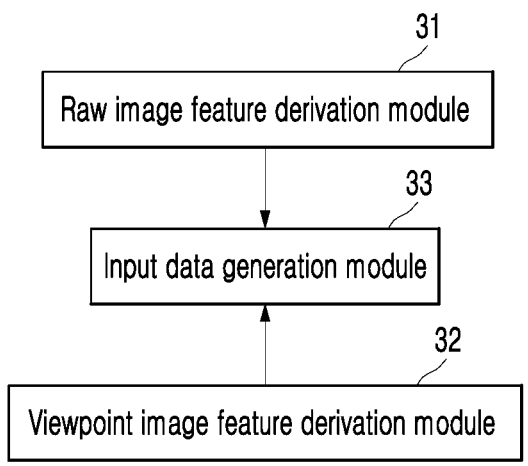
FIG. 2 is a detailed configuration diagram showing a preprocessing unit according to the embodiment.
Figures 3, 4:
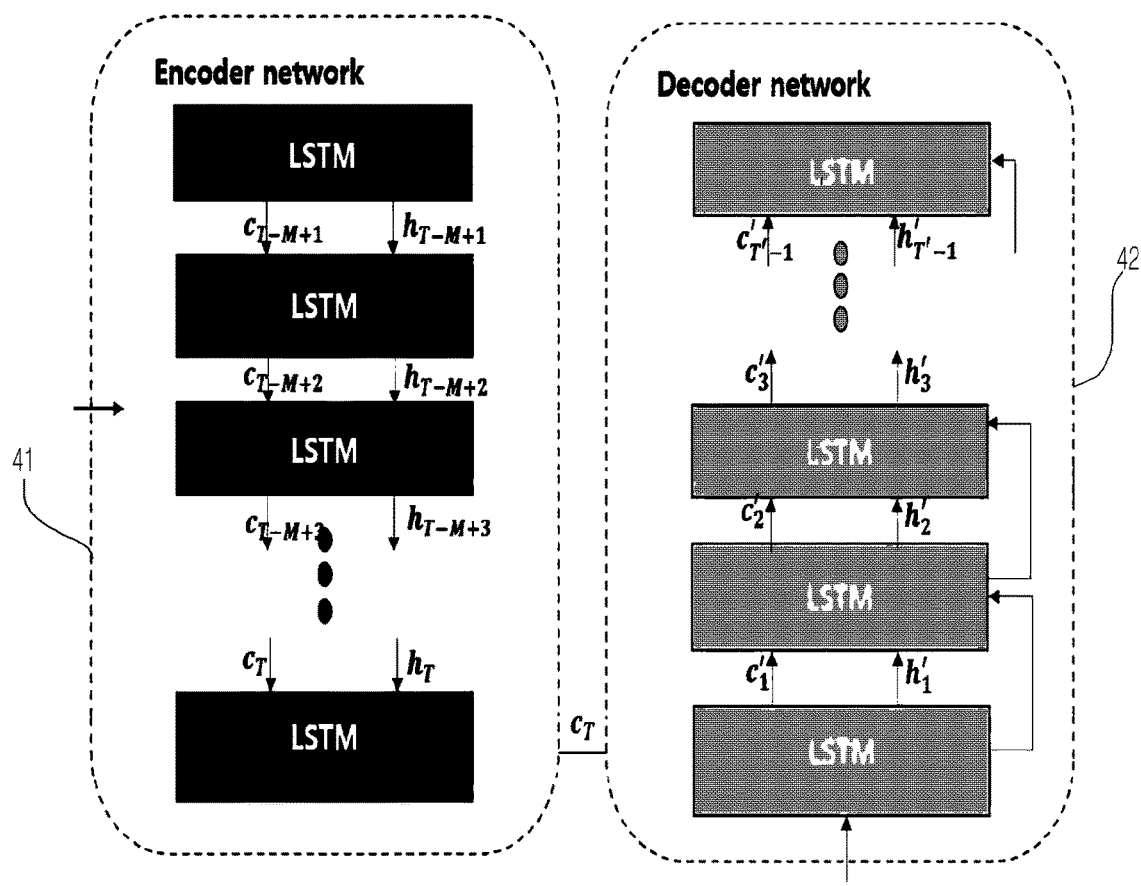

FIG. 1 is a configuration diagram showing an LSTM based personalization viewpoint estimation apparatus according to an embodiment. FIG. 2 is a detailed configuration of a preprocessing unit of FIG. 1. FIG. 3 is a detailed configuration diagram showing an LSTM execution unit of FIG. 1.

Referring to FIGS. 1 to 3, an LSTM based personalization viewpoint estimation apparatus according to an embodiment includes a configuration provided to estimate a user viewpoint in a predetermined future on the basis of LSTM with respect to a 360-degree raw image and a viewpoint image that is a region of interest of a user. The apparatus according to the embodiment may include a raw image acquisition unit 10, a viewpoint image acquisition unit 20, a preprocessing unit 30, an LSTM execution unit 40, and a transmission unit 50.

Herein, the raw image acquisition unit 10 acquires 360-degree raw images by using multiple cameras. The raw images may be acquired through the multiple cameras and the number of cameras is not limited. Since the 360-degree images include information on all directions, the 360-degree images have data size four to six times larger than that of a general 2D image in the same resolution.

In the meantime, the viewpoint image acquisition unit 20 acquires a user viewpoint image that is a region of interest of the user among the raw images of the respective frames, through the degrees of freedom (DoF) of a head mounted display (HMD). Herein, depending on a field of view of the user, the HMD measures nodding up and down, turning the field of view left and right, and tilting the user's head while looking forward, namely, 3DoF. The viewpoint image acquisition unit 20 acquires a user viewpoint image among the acquired 360-degree raw images on the basis of the measured 3DoF.

The user viewpoint image refers to a region that is viewed from a user viewpoint rather than requesting all the 360-degree regions because only a particular region is viewed depending on the movement of the head mounted display (HMD) for a 360-degree video.

Herein, regarding the user viewpoint, spherical 360-degree images are transformed into a 2D flat frame in the form of the equirectangular projection (ERP) through the gnomonic projection, and like viewing the 360-degree images in the form of the equirectangular projection (ERP) in a 3D spherical coordinate system, a user viewpoint with no distortion is calculated. That is, like viewing the 360-degree raw images in the ERP form in a 3D spherical coordinate system, a user's field of view (FoV) λ with no distortion may be expressed in Equation 1 below.

$$\lambda = \lambda_0 + \tan^{-1}\left(\frac{x\sin(c)}{\rho\cos\phi_1\cos(c) - y\sin\phi_1\sin(c)}\right) \quad \text{[Equation 1]}$$

$$\phi = \sin^{-1}\left(\cos(c)\sin\phi_1 + \frac{y\sin(c)\cos\phi_1}{\rho}\right)$$

where, $\rho = \sqrt{x^2 + y^2}$ and $c = \tan^{-1}\rho$

The 360-degree raw images in the form of the equirectangular projection (ERP) are projected onto a spherical coordinate system by computing latitude and longitude values (λ,φ) for each pixel with respect to central latitude and longitude value $(\lambda_0,\phi_0)=(0,0)$ each pixel position (x,y).

Regarding the distortion generated at this time, because a peripheral field of view with no distortion is viewed, a user viewpoint image (FoV) with no distortion that the user actually views is derived by applying the inverse gnomonic projection.

The raw images and the user viewpoint images are transmitted to the preprocessing unit 30. The preprocessing unit 30 extracts 1D features of the raw image and the user viewpoint image for each frame by using a convolutional neural network algorithm and combines the extracted features and a user position into a series of vectors, thereby generating input data. The preprocessing unit 30 may include a raw image feature derivation module 31, a viewpoint image feature derivation module 32, and an input data generation module 33.

The raw image feature derivation module 31 derives a 1D feature of the raw image for each frame by using a convolutional neural network (CNN) algorithm. That is, the CNN is an algorithm that generates feature maps by applying a filter to the input raw image and progressively reduces the sizes, thereby extracting only features.

In the meantime, the viewpoint image feature derivation module 32 derives a 1D feature of the user viewpoint image for each frame by using the convolutional neural network (CNN) algorithm.

The input data generation module 33 generates input data by combining the derived features of the raw image and the user viewpoint image and a user position into a series of vectors.

That is, in the input data generation module 33, reconstruction is performed passing a feature extractor that is a model structured through the CNN. The feature extractor extracts a 1D feature from images in three dimensions of width, height, and channel of the 360-degree raw image and the user viewpoint image (FoV). Next, the features extracted from all the 360-degree frames and a current position of the user are combined into a series of vectors. Consequently, input data in the form of a feature size M is generated.

For example, including the 360-degree raw image in the ERP form, a user's position derived using a sensor (not shown) of a VR device, and a user's field of view for time t, input data $(O_t)$ may be expressed in Equation 2 below.

$$O_i = \{f_i, x_i, y_i, v_i\} \quad \text{[Equation 2]}$$

Herein, with respect to any time t, $f_t$ denotes a frame of a raw image in an ERP form, $(x_t, y_t)$ denotes position values ranging from 0 to 1 acquired by normalizing the user's viewpoint position when a frame of a user viewpoint image is expressed in a 2D rectangular coordinate system, and $v_t$ denotes a user viewpoint image (FoV) with no distortion in which the user actually views $f_t$ at $(x_t, y_t)$. Herein, a process of deriving the user viewpoint image (FoV) with no distortion is as described above.

The input data of the input data generation module 33 is transmitted to the LSTM execution unit 40.

The LSTM execution unit 40 includes a configuration for estimating a user viewpoint in a predetermined future by performing learning on the input data of the preprocessing unit. The LSTM execution unit 30 includes an encoder 41 and a decoder 42 as shown in FIG. 3.

That is, the encoder 41 computes a feature on the basis of the former input data, calculates compressed feature data for estimating a future viewpoint with respect to the former field of view of the user, and performs learning.

For example, the encoder 41 transmits, to the decoder 42, features extracted and state vectors computed with respect to $\{O_{T-M+1}, \ldots O_T\}$ of any integer M user viewpoint movements, actual user viewpoint images (FoV), and frames of ERP-form raw images. That is, features of the input data may be extracted by applying a recursive neural network (RNN) technique.

That is, the RNN is configured in the following structure: with respect to input vectors $x=(x_1, \ldots, x_t)$, output vectors $y=(y_1, \ldots, y_t)$, and state vectors $h=(h_1, \ldots, h_t)$, a state vector $h_{t-1}$ computed on the basis of input data of the previous time t−1 is transmitted for a current state vector $h_t$ and previous information is used in computing current information so that the previous information is remembered.

Herein, as time t increases, state vectors decrease and actual updates of RNN parameters thus decrease, resulting in loss of differential values (gradient vanishing) on which learning is not performed. In order to prevent such loss, two types of state vectors that are a state vector $h_t$ and a long-term state vector $c_t$ called cell memory are provided, and the state vector $h_t$ is updated as shown in Equation 3 below.

$$f_t = \sigma(W_{xf}x_t + W_{hf}h_{t-1} + b_f)$$

$$i_t = \sigma(W_{xi}x_t + W_{hi}h_{t-1} + b_i)$$

$$o_t = \sigma(W_{xo}x_t + W_{ho}h_{t-1} + b_o)$$

$$c_t = f_t * c_{t-1} + i_t * \tan h(W_{xc}x_t + W_{hc}h_{t-1} + b_c)$$

$$h_t = o_t * \tan h(c_t) \quad \text{[Equation 3]}$$

That is, for input data, a weight ranging from 0 to 1 is derived on the basis of an activation function (sigmoid) σ in a hidden layer and an input layer, and the product of output of the hidden layer and a long-term state vector $c_{t-1}$ is added to the product of output of the input layer and output of a tan h function, thereby deriving a long-term state vector $c_t$.

The long-term state vector $c_t$ is provided to the tan h function of the output layer, and the encoder 41 performs multiplication with the state vector $c_t$, so that a final short-term state vector $h_t$ and a final long-term state vector $c_t$ are output.

The decoder 42 receives a long-term state vector $c_t$ from the encoder 41 at every time t and performs learning so as to estimate the user viewpoint in the future t'.

The decoder 42 outputs a user viewpoint position of the future T' $\{(x_{T+1}, y_{T+1}), \ldots (x_{T+T'}, y_{T+T'})\}$ estimated in a recursive manner on the basis of the probability calculated using the long-term state vector $c_t$ of the received cell, and computes a tile of the output user viewpoint position.

The tile of the user viewpoint position is transmitted to the transmission unit 50, and a tile of a user viewpoint image of the future is transmitted.

According to the embodiment, a viewpoint of a user is estimated using LSTM with respect to a 360-degree raw image and a viewpoint image that is a region of interest of the user and a tile including the estimated viewpoint is transmitted over a network, so that the amount of data to transmit compared to the network bandwidth may be reduced and a viewpoint of each individual may be estimated.

Simulation

FIGS. 4 to 7 are exemplary diagrams showing performance according to evaluation criteria for each of raw images Cockpit, Turtle, Underwater Park, Bar, and Touvet according to the embodiment. Referring to FIGS. 4 to 7, a result of performing simulation is found, wherein a learning rate is set as shown in Equation 11 below, a ratio of the numbers of fully connected layers to units is set to 2/128, the number of LSTM cells is set to 512, a batch size is set to 1, the number of estimation samples (T') is set to 5, the length (M) of observation is set to 50, and a feature extractor is set to desnenet 121.

$$\text{learning rate} = \begin{cases} 0.01 & \text{epochs} < 10 \\ 0.01 - \exp(0.1 * (10 - \text{epochs})) & \text{epochs} \geq 10 \end{cases} \quad \text{[Equation 11]}$$

Herein, epochs denote the number of times that learning is repeated, and Batch denotes a number that specifies whether to update the weight with a determined sample.

In the meantime, evaluation criteria for the LSTM based personalization viewpoint estimation apparatus of the embodiment may be checked on the basis of precision, recall, and F1 score.

Herein, precision and recall are derived by Equation 12 below, and F1 score is derived by Equation 13 below.

$$(\text{Precision}) = \frac{TP}{TP + FP} \quad \text{[Equation 12]}$$
$$(\text{Recall}) = \frac{TP}{TP + FN}$$
$$(f-\text{score}) = \frac{2}{\frac{1}{\text{Precision}} + \frac{1}{\text{Recall}}} = 2 \cdot \frac{\text{Precision} \cdot \text{Recall}}{\text{Precision} + \text{Recall}} \quad \text{[Equation 13]}$$

Herein, TP denotes a value wherein the answer that is actually true is estimated as being true, FP denotes a value wherein the answer that is actually false is estimated as being true, FN denotes a value wherein the answer that is actually true is estimated as being false, and TN denotes a value wherein the answer that is actually false is estimated as being false.

FIG. 4 is an exemplary diagram showing loss and accuracy for each of the data sets train, validation, and test. Referring to FIG. 4, for all data sets, it was found that loss and accuracy computed on the basis of a loss function (MAE) according to the embodiment were low loss and high accuracy, compared to a conventional method.

FIG. 5 is an exemplary diagram showing evaluation criteria for the test set of a 4×4-tile raw image. FIG. 6 is an exemplary diagram showing evaluation criteria for the test set of a 5×5-tile raw image. FIG. 7 is an exemplary diagram showing evaluation criteria for the test set of a 6×6-tile raw image.

Referring FIGS. 5 to 7, it was found that within the raw image Turtle, compared to the other images, movement of a particular object, such as a turtle, was relatively higher in performance of the embodiment than performance based on the conventional method.

However, in the case of the landscape in the raw image Touvet, compared to the other images, it was found that when a region of interest (RoI) was not clear, there was little difference between performance indexes of the embodiment and conventional performance indexes and that it was difficult to perform accurate estimation.

That is, as more detailed tiles are applied in the same image, the size of each of the tiles decreases and the number of tiles to transmit in one user viewpoint (FoV) increases. Therefore, it was found that as the number of tiles increased, FPs and FNs of estimated tiles and actual tiles increased and overall, performance indexes decreased.

Figure 8:
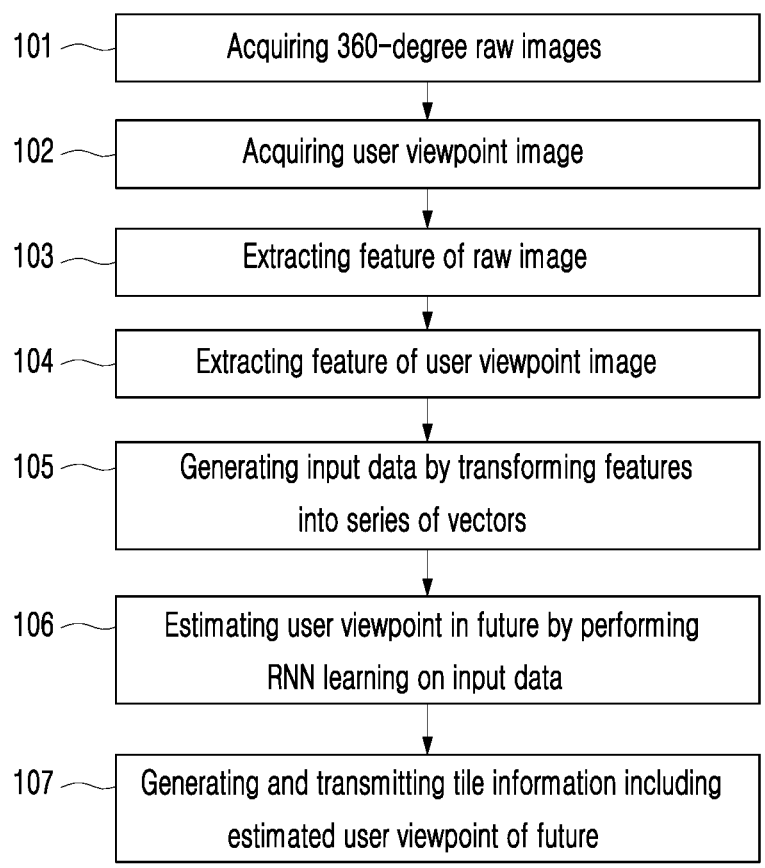
FIG. 8 is an overall flowchart showing a process of LSTM based personalization viewpoint estimation according to another embodiment.

FIG. 8 is an overall flowchart showing a process of operation of the LSTM based personalization viewpoint estimation apparatus of FIG. 1. With reference to FIG. 8, an LSTM based personalization viewpoint estimation method according to another embodiment of the present disclosure will be described.

First, at step 101, the raw image acquisition unit 10 of the embodiment acquires 360-degree raw images in the form of equirectangular projection (ERP) of a predetermined number of frames.

At step 102, the viewpoint image acquisition unit 20 of the embodiment acquires a viewpoint image from the acquired raw images of the respective frames, through the degrees of freedom (DoF) of the HMD. The raw images and the user viewpoint images are transmitted to the preprocessing unit 30.

At steps 103 to 105, the preprocessing unit 30 of the embodiment extracts 1D features of the raw image and the viewpoint image for each frame by using the convolutional neural network algorithm, and combines the extracted features and the extracted user positions into a series of vectors to generate input data. The input data is transmitted to the LSTM execution unit 40.

At step 106, the LSTM execution unit 40 of the embodiment estimates a user viewpoint in a predetermined future by performing recursive neural network (RNN) learning on the input data.

At step 107, the transmission unit 50 of the embodiment transmits tile information including the estimated user viewpoint of the future.

According to the embodiment, a viewpoint of a user is estimated using LSTM with respect to a 360-degree raw image and a viewpoint image that is a region of interest of the user and a tile including the estimated viewpoint is transmitted over a network, so that the amount of data to transmit compared to the network bandwidth may be reduced and a viewpoint of each individual may be estimated.

Although the present disclosure has been described with reference to exemplary embodiments in conjunction with the drawings, it should be understood that these embodiments are given by way of illustration only and do not limit the scope of the disclosure, and that various modifications, variations, and alterations can be made by those skilled in the art. Accordingly, the scope of the present disclosure should be determined by the accompanying claims.

INDUSTRIAL APPLICABILITY

The present disclosure relates to an LSTM based personalization viewpoint estimation apparatus and method, wherein a viewpoint of a user is estimated using LSTM with respect to a 360-degree raw image and a viewpoint image that is a region of interest of the user and a tile including the estimated viewpoint is transmitted over a network, so that the amount of data to transmit compared to the network bandwidth may be reduced and a viewpoint of each individual may be estimated. Thus, considerable progress may be achieved in terms of accuracy and reliability of operation of the apparatus and the method as well as performance efficiency. The present disclosure not only has sufficient possibility of commercialization or sales of AR and VR systems but also be clearly implemented in practice. Therefore, the present disclosure is industrially applicable.

What is claimed is:

1. A Long Short Term Memory (LSTM) based personalization viewpoint estimation apparatus, comprising:
    a raw image acquisition unit acquiring 360-degree raw images of a predetermined number of frames through multiple cameras;
    a viewpoint image acquisition unit acquiring a user viewpoint image that is a region of interest of a user among the acquired raw images of the respective frames, through degrees of freedom (DoF) of a head mounted display (HMD);
    a preprocessing unit extracting a 1D feature of the raw image and the user viewpoint image for each frame by using a convolutional neural network algorithm, and combining the extracted features and user positions into a series of vectors to generate input data;
    an LSTM execution unit estimating a user viewpoint in a predetermined future by performing learning on the input data of the preprocessing unit; and
    a transmission unit transmitting tile information including the estimated user viewpoint of the future over a network.

2. The LSTM based personalization viewpoint estimation apparatus of claim 1, wherein the raw images are in an equirectangular projection (ERP) form.

3. The LSTM based personalization viewpoint estimation apparatus of claim 2, wherein the input data comprises at least one among the ERP image of any integer t frame, a value acquired by normalizing a viewpoint position derived through the DoF, and the viewpoint image with no distortion.

4. The LSTM based personalization viewpoint estimation apparatus of claim 3, wherein the LSTM execution unit is a time-series deep-learning artificial neural network performing estimation of the viewpoint with respect to the input data.

5. The LSTM based personalization viewpoint estimation apparatus of claim 1, wherein the LSTM execution unit comprises:
    an encoder extracting feature data for executing LSTM on the input data of the preprocessing unit, and transmitting the extracted feature data and a computed state vector; and
    a decoder estimating the viewpoint in the predetermined future by performing learning on the feature data and the state vector.

6. A Long Short Term Memory (LSTM) based personalization viewpoint estimation method, comprising steps of:
    acquiring 360-degree raw images in an equirectangular projection (ERP) form of a predetermined number of frames through multiple cameras;
    acquiring a viewpoint image from the acquired raw images of the respective frames, through degrees of freedom (DoF) of a head mounted display (HMD);
    preprocessing for extracting a 1D feature of the raw image and the viewpoint image for each frame by using a convolutional neural network algorithm, and combining the extracted features and user positions into a series of vectors to generate input data;
    estimating a user viewpoint in a predetermined future by performing learning on the input data of the preprocessing step based on LSTM; and
    transmitting tile information including the estimated user viewpoint of the future over a network.

7. The LSTM based personalization viewpoint estimation method of claim 6, wherein the input data comprises at least one among the ERP image of any integer t frame, a value acquired by normalizing a viewpoint position derived through the DoF, and the viewpoint image with no distortion.

8. The LSTM based personalization viewpoint estimation method of claim 6, wherein the estimating step comprises:
    extracting feature data for executing LSTM on the input data of the preprocessing step, and transmitting the extracted feature data and a computed state vector; and
    estimating the user viewpoint of the predetermined future by performing learning on the basis of the feature data and the state vector.

9. A non-transitory computer-readable recording medium having a program recorded thereon, the program being for executing a Long Short Term Memory (LSTM) based personalization viewpoint estimation method comprising steps of:
    acquiring 360-degree raw images in an equirectangular projection (ERP) form of a predetermined number of frames through multiple cameras;
    acquiring a viewpoint image from the acquired raw images of the respective frames, through degrees of freedom (DoF) of a head mounted display (HMD);
    preprocessing for extracting a 1D feature of the raw image and the viewpoint image for each frame by using a convolutional neural network algorithm, and combining the extracted features and user positions into a series of vectors to generate input data;
    estimating a user viewpoint in a predetermined future by performing learning on the input data of the preprocessing step based on LSTM; and
    transmitting tile information including the estimated user viewpoint of the future over a network.

* * * * *